US008555639B2

(12) United States Patent
Watanabe et al.

(10) Patent No.: US 8,555,639 B2
(45) Date of Patent: Oct. 15, 2013

(54) POWER SOURCE CONTROL UNIT OF ELECTRIC SUPERCHARGER

(75) Inventors: Masutaka Watanabe, Chiyoda-ku (JP); Yohei Akashi, Chiyoda-ku (JP); Hideyuki Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 408 days.

(21) Appl. No.: 12/939,710

(22) Filed: Nov. 4, 2010

(65) Prior Publication Data

US 2011/0174278 A1 Jul. 21, 2011

(30) Foreign Application Priority Data

Jan. 15, 2010 (JP) ................................. 2010-007032

(51) Int. Cl.
*F02B 33/44* (2006.01)

(52) U.S. Cl.
USPC ............................................................ 60/608

(58) Field of Classification Search
CPC ...................................................... F02B 37/10
USPC ......... 60/612, 607–609; 123/344, 559.1, 565; 320/2; 290/40 B, 40 C, 40 R, 46–52
IPC ....................................................... F02B 37/10
See application file for complete search history.

(56) References Cited

U.S. PATENT DOCUMENTS

| 4,745,755 | A | * | 5/1988 | Kawamura | 60/608 |
| 4,878,347 | A | * | 11/1989 | Kawamura | 60/608 |
| 4,882,905 | A | * | 11/1989 | Kawamura | 60/608 |
| 4,894,991 | A | * | 1/1990 | Kawamura | 60/608 |
| 5,038,566 | A | * | 8/1991 | Hara | 60/608 |
| 5,604,426 | A | * | 2/1997 | Okamura et al. | 323/282 |
| 5,765,656 | A | * | 6/1998 | Weaver | 180/65.22 |
| 5,906,098 | A | * | 5/1999 | Woollenweber et al. | 60/608 |
| 6,075,331 | A | * | 6/2000 | Ando et al. | 318/376 |
| 6,104,165 | A | * | 8/2000 | Miyamoto et al. | 320/125 |
| 6,647,724 | B1 | * | 11/2003 | Arnold et al. | 60/608 |

(Continued)

FOREIGN PATENT DOCUMENTS

| EP | 1376812 A2 | * | 1/2004 |
| JP | 05-098987 A | | 4/1993 |

(Continued)

OTHER PUBLICATIONS

Translation EP 1376812 A2 Jan. 2004.*

*Primary Examiner* — Kenneth Bomberg
*Assistant Examiner* — Jason T Newton
(74) *Attorney, Agent, or Firm* — Sughrue Mion, PLLC

(57) ABSTRACT

An on-off switch is provided between a first battery acting to supply an electric power to on-vehicle electrical equipment and a second battery acting to supply an electric power to an electric supercharger. In the case that charge voltage of the first battery is smaller than a predetermined value and operating power of an electric supercharger 3 is larger than a predetermined value, the on-off switch is opened to suppress electrical effects on the on-vehicle electrical equipment. In other cases, the on-off switch is closed and the second battery is charged by a generator and the first battery. As a result, it is possible to suppress adverse effects on the on-vehicle electrical equipment due to voltage drop or voltage fluctuation of a power source occurring by driving the electric supercharger and thus to make a stable power supply.

20 Claims, 4 Drawing Sheets

(56) References Cited

U.S. PATENT DOCUMENTS

| | | | |
|---|---|---|---|
| 6,705,084 B2* | 3/2004 | Allen et al. | 60/608 |
| 6,739,845 B2* | 5/2004 | Woollenweber | 417/407 |
| 7,137,253 B2* | 11/2006 | Furman et al. | 60/608 |
| 7,208,894 B1* | 4/2007 | Earle | 318/105 |
| 7,210,296 B2* | 5/2007 | Bolz et al | 60/608 |
| 7,242,159 B2* | 7/2007 | Ishikawa et al. | 318/139 |
| 7,367,189 B2* | 5/2008 | Ishiwatari | 60/608 |
| 7,573,151 B2* | 8/2009 | Acena et al. | 307/9.1 |
| 8,039,976 B2* | 10/2011 | Sato et al. | 290/40 C |
| 2003/0140905 A1* | 7/2003 | Nau et al. | 123/559.3 |
| 2004/0093867 A1* | 5/2004 | Masuda | 60/608 |
| 2004/0194466 A1* | 10/2004 | Kawamura et al. | 60/612 |
| 2005/0144947 A1* | 7/2005 | Masuda | 60/608 |
| 2006/0162333 A1* | 7/2006 | Isogai | 60/601 |
| 2006/0196183 A1* | 9/2006 | Isogai | 60/607 |
| 2007/0108772 A1* | 5/2007 | Shibui et al. | 290/52 |
| 2007/0137626 A1* | 6/2007 | Turner | 123/559.1 |
| 2007/0151241 A1* | 7/2007 | Arnold | 60/605.1 |
| 2007/0157910 A1* | 7/2007 | Obayashi et al. | 123/559.1 |
| 2007/0169747 A1* | 7/2007 | Shimizu | 123/434 |
| 2008/0047525 A1* | 2/2008 | Morizane et al. | 123/344 |
| 2008/0065301 A1* | 3/2008 | Sheidler et al. | 701/54 |
| 2008/0148730 A1* | 6/2008 | Akita | 60/608 |
| 2009/0000298 A1* | 1/2009 | Barthelet | 60/608 |
| 2009/0025386 A1* | 1/2009 | Rumsby | 60/607 |
| 2009/0026838 A1* | 1/2009 | Abe | 307/10.1 |
| 2009/0056681 A1* | 3/2009 | Shibui et al. | 123/559.1 |
| 2009/0194044 A1* | 8/2009 | Nishida | 123/41.02 |
| 2009/0222188 A1* | 9/2009 | Igarashi | 701/102 |
| 2009/0320468 A1* | 12/2009 | Shimizu et al. | 60/608 |
| 2010/0090529 A1* | 4/2010 | Yoshida | 307/31 |
| 2010/0107632 A1* | 5/2010 | Wu et al. | 60/608 |
| 2012/0256568 A1* | 10/2012 | Lee | 318/139 |

FOREIGN PATENT DOCUMENTS

| | | | |
|---|---|---|---|
| JP | 05098987 A | * | 4/1993 |
| JP | 06-346747 A | | 12/1994 |
| JP | 2008240635 A | * | 10/2008 |

* cited by examiner

POWER SOURCE CONTROL UNIT OF ELECTRIC SUPERCHARGER

BACKGROUND OF THE INVENTION

1. Field of the Invention

The present invention relates to a power source control unit of an electric supercharger to suppress effects on on-vehicle electrical equipments by operation of an electric supercharger that is disposed in an intake passage of an internal combustion engine and driven by an electric motor and, in particular, to a power source control unit of an electric supercharger using a generator and two batteries in combination.

2. Description of the Related Art

Recently, superchargers acting to increase an intake pressure of an internal combustion engine using exhaust energy to augment its output have been widely utilized.

Incidentally, the term ""supercharger"" includes an apparatus to supply air for combustion into a cylinder of an internal combustion engine with higher pressure than is obtained from natural intake.

Furthermore, electric superchargers have been developed to be mounted on the mentioned supercharger for the purpose of raising transient response as well as improving fuel consumption of automobiles, and the electric superchargers are to cover the shortage of supercharge of the supercharger at the time of low engine speed.

Since, however, a large torque is required at the time of driving an electric supercharger, a large electric current flows to the electric supercharger. Therefore, any voltage drop or voltage fluctuation occurs at a battery terminal and there is a possibility to adversely affect on-vehicle electrical equipments.

For example, in ""Control Unit of Turbocharger equipped with Electric Rotating Machine"" described in the Japanese Patent Publication (unexamined) No. 98987/1993, a battery is used for power supply of an electric supercharger, and a generator is used for power supply of on-vehicle electrical equipments.

On the occasion of charging the battery, a surplus of exhaust energy is converted to an electric energy using the electric supercharger to charge the battery to a predetermined battery charge amount. Thereafter, charging the on-vehicle electrical equipments is conducted using the generator. In this manner, adverse effects on the on-vehicle electrical equipments owing to voltage drop are suppressed.

For another example, in ""Power Source Unit of Vehicles"" described in the Japanese Patent Publication (unexamined) No. 346747/1994, a battery and a capacitor are employed as the power supply source of an electric supercharger, and in which the capacitor is used in the beginning of driving the electric supercharger that needs a large electric current, and thereafter the electric supercharger is driven by the additional use of the battery.

Further, when power generation is conducted by the electric supercharger using a surplus of exhaust energy, a capacitor having superior charge or discharge characteristics is charged, and after its full charge has been done, the battery is charged. In this manner, an efficient charge or discharge can be conducted.

In the above-mentioned Japanese Patent Publication (unexamined) No. 98987/1993, at the time of driving the electric supercharger, power supply to the on-vehicle electrical equipments is conducted using the generator.

There is, however, a possibility that a sufficient amount of electric power the on-vehicle electrical equipments will need cannot be supplied only by the generator. Moreover, in case of more power generation of the generator, the engine load is increased and fuel consumption will come worse.

In the above-mentioned Japanese Patent Publication (unexamined) No. 346747/1994, in the case that the electric supercharger is driven to be on or off, the power supply from the capacitor cannot be conducted and there is a possibility that the voltage fluctuation of the battery occurs due to that the electric supercharger is driven.

SUMMARY OF THE INVENTION

The present invention was made to solve the above-discussed problems and has an object of providing a power source control unit of an electric supercharger that can suppress adverse effects on on-vehicle electrical equipments owing to the voltage drop or voltage fluctuation of a power source caused by driving an electric supercharger, and can conduct a stable power supply.

A power source control unit of an electric supercharger according to the invention includes: an electric supercharger located at an intake passage of an internal combustion engine and driven by an electric motor; an inverter making a drive control of the mentioned electric supercharger; and a power supply control unit controlling a power supply to the mentioned electric supercharger via the mentioned inverter and a power supply to an on-vehicle electrical equipment other than the mentioned electric supercharger; and in which the mentioned power supply control unit includes: a generator generating an electric power using a power of the internal combustion engine; a first battery for supplying an electric power to the mentioned on-vehicle electrical equipments; voltage detection means detecting a voltage of the mentioned first battery; a second battery for supplying an electric power to the mentioned electric supercharger; operating power detection means detecting an operating power of the mentioned electric supercharger; switching means making a switch between the mentioned first battery and second battery; current amount detection means detecting an amount of current carried through the mentioned switching means; and a controller controlling the mentioned switching means; and in which the mentioned controller controls the mentioned switching means in accordance with a voltage of the mentioned first battery that the mentioned voltage detection means detects, an operating power of the mentioned electric supercharger that the mentioned operating power detection means detects, and an electric current carried through the mentioned switching means.

Furthermore, in the power source control unit of an electric supercharger according to the invention, the mentioned controller controls the mentioned switching means and breaks a circuit between the mentioned first battery and second battery, in the case that the voltage of the mentioned first battery that the mentioned voltage detection means detects is smaller than a predetermined voltage value.

Moreover, in the power source control unit of an electric supercharger according to the invention, the mentioned controller controls the mentioned switching means and breaks the circuit between mentioned first battery and second battery, in the case that an operating power of the mentioned electric supercharger is larger than a predetermined electric power.

According to the invention, as described above, the controller controls the switching means in accordance with a voltage of the first battery that the voltage detection means detects, an operating power of the electric supercharger that the operating power detection means detects and an electric current carried through the switching means.

As a result, it is possible to provide a power source control unit of an electric supercharger that can suppress adverse effects on on-vehicle electrical equipments owing to the voltage drop or voltage fluctuation of a power source caused by driving an electric supercharger and that can conduct a stable power supply.

Further, according to the invention, as described above, in the case that a voltage value of the first battery supplying an electric power to the on-vehicle electrical equipments is smaller than a predetermined value or in the case that an operating power of the electric supercharger is larger than a predetermined power value when the electric supercharger is driven, power supply is interrupted using the switching means making a switch between the first battery supplying an electric power to the on-vehicle electrical equipments and the second battery supplying an electric power to the electric supercharger.

As a result, it is possible to suppress the voltage drop and voltage fluctuation of the first battery terminal due to the flow of a large electric current that occurs when the electric supercharger is driven.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
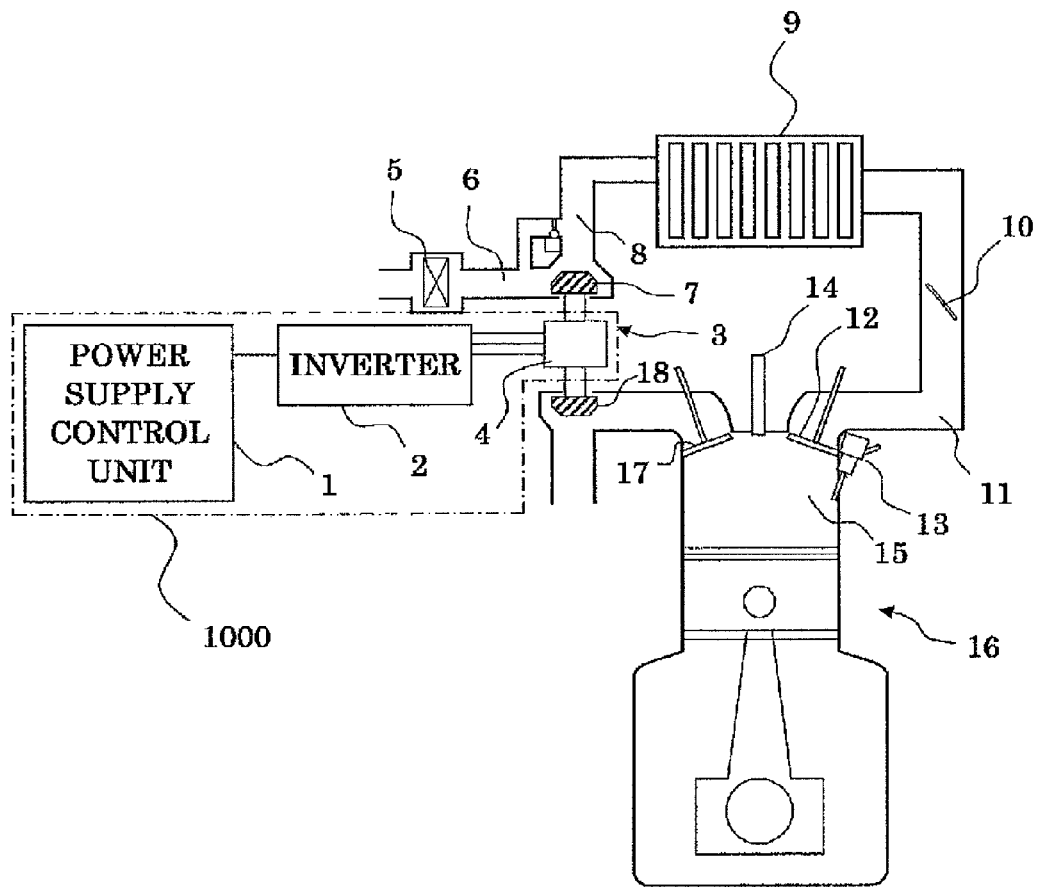
FIG. 1 is a schematic diagram illustrating the whole of a gasoline engine on which an electric supercharger according to a preferred embodiment of the present invention is mounted.

A preferred embodiment according to the present invention is hereinafter described with reference to the accompanying drawings.

In this regard, the same reference numerals are designated to the same or like parts in the drawings.

Embodiment 1

FIG. 1 is a diagram illustrating the entire construction of a gasoline engine on which a "power source control unit 1000 of an electric supercharger" according to Embodiment 1, being one preferred embodiment, is mounted.

A gasoline engine 16 is illustrated in the cross sectional diagram of just one cylinder of a multi-cylinder engine.

Incidentally, although an internal combustion engine to be described in this embodiment is illustratively a multi-cylinder gasoline engine, it may be a diesel engine or a rotary engine.

Furthermore, in terms of the combustion system of an engine, this embodiment of the invention is applicable not only to a direct injection engine injecting fuel using an injector 13 located in a cylinder 15, but also to a port injection engine injecting fuel into an intake-manifold downstream of a throttle valve 10.

The drive of a gasoline engine on which an electric supercharger 3 is mounted is now described with reference to FIG. 1.

Air is taken in from atmosphere and first the dust in the atmosphere is removed using an air cleaner 5.

Next, the air of which dust has been removed by the air cleaner 5 flows through a compressor upstream passage and is compressed through a compressor impeller (impeller; vane) of the electric supercharger 3.

The compressor impeller 7 of the electric supercharger 3 is disposed coaxially with a turbine wheel 18 and constructed to be able to drive by both turbine wheel and electric motor 4.

The air having passed through a compressor downstream passage 8 to be compressed, since its temperature is increased due to the rise of pressure, is cooled by an intercooler 9 for the purpose of improving charge efficiency.

This air (air-fuel mixture in the case of a port injection engine) is sucked into an engine 16 in accordance with the opening of a throttle valve 10 to be driven by an actuator.

The air having been supercharged by opening an inlet valve 12 is charged into a cylinder 15, and the charged air is ignited by a spark plug 14 and combusted. The combusted gas is exhausted through an exhaust valve 17 to drive the turbine wheel 18.

In the case that the sufficient number of revolutions of the turbine wheel 18 can be obtained using the exhaust gas, its exhaust energy is utilized to conduct electric power regeneration by power generation.

Figure 2:
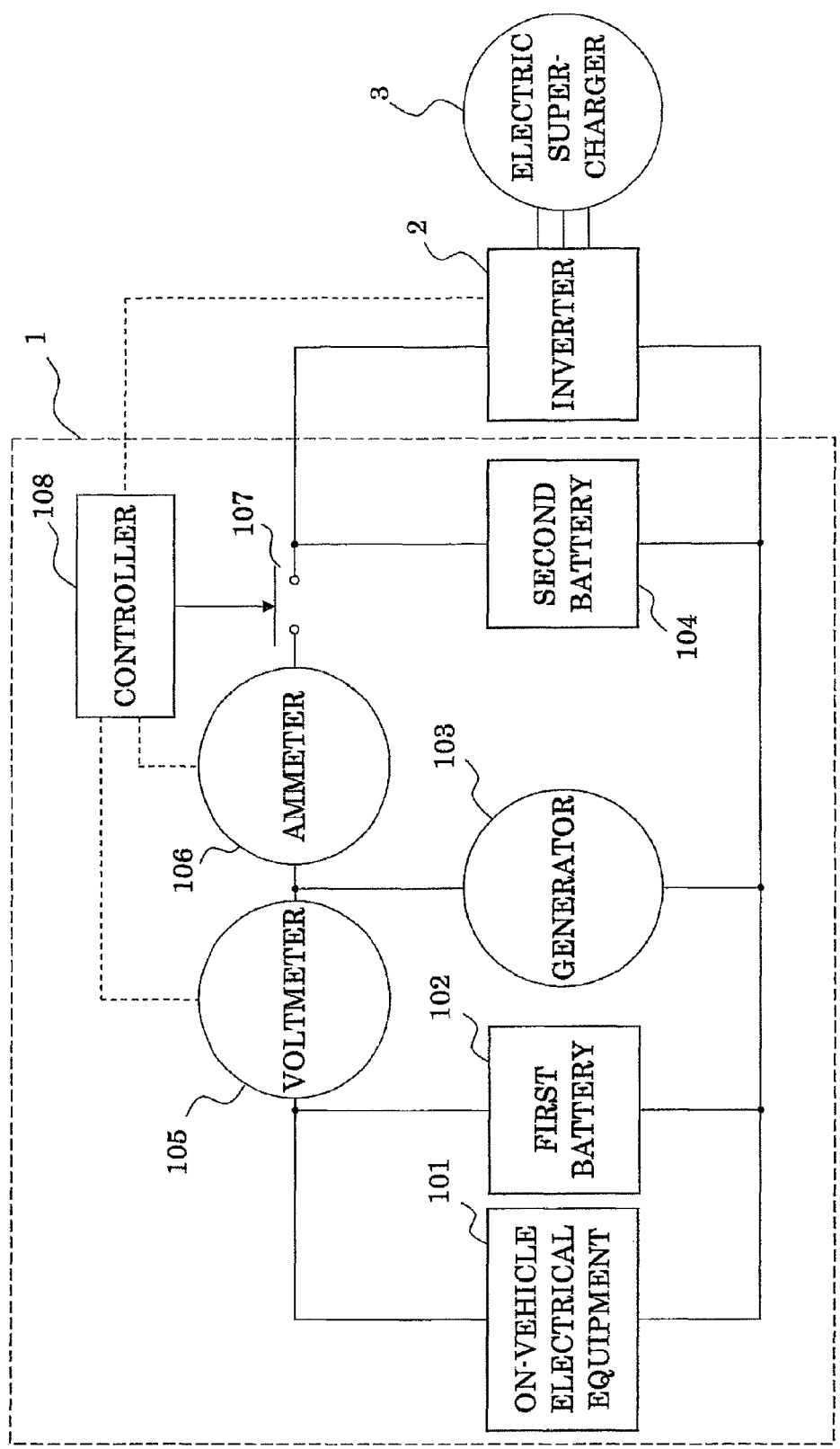
FIG. 2 is a schematic diagram illustrating the whole of a power source control unit of the electric supercharger according to the embodiment of the invention.

FIG. 2 is a diagram illustrating an arrangement of the "power source control unit of an electric supercharger" according to this embodiment.

The power source control unit of an electric supercharger according to this embodiment is provided with an electric supercharger 3, an inverter 2 that makes the drive control of this electric supercharger 3 and that can detect the operating power amount of the electric supercharger 3, and a power supply control unit 1 to control the power supply to an on-vehicle electrical equipment 101, the electric supercharger 3 and the like.

The power supply control unit 1 is mainly made up of an on-vehicle electrical equipment 101, a first battery 102 supplying an electric power to the on-vehicle electrical equipment 101, a second battery 104 supplying an electric power to the electric supercharger 3 via the inverter 2, a generator 103 for supplying an electric power to the on-vehicle electrical equipment 101 and charging the first battery 102 or the second battery 104, a voltmeter 105 detecting the charge voltage of the first battery 102, an on-off switch 107 making a switch between the power supply source of the electric supercharger 3 and the power supply source of the on-vehicle electrical equipment 101 (that is, switching means making a switch between the first battery 102, the generator 103, and the second battery 104), an ammeter 106 detecting an electric current flowing through the on-off switch 107 and a controller 108 controlling the on-off switch 107.

The electric supercharger 3 is provided with an electric motor 4 that is attached to the turbocharger to drive using exhaust energy, and covers the shortage of supercharge of a supercharger at the time of low engine speed.

In the case that the amount of supercharge pressure is more than that is needed and there is surplus exhaust energy, the electric supercharger 3 is used as a generator and the second battery 104 is charged.

Incidentally, it is also preferable that the electric supercharger 3 does not employ an electric assisted turbocharger in which the electric motor 4 is attached to a turbocharger, but employs an electric compressor that is disposed in an intake passage and makes a supercharge using an electric motor.

The inverter 2 is the one making a drive control of the electric supercharger 3, and controls the drive of the electric supercharger 3 in response to the command value of the engine speed of an internal combustion engine, the number of revolutions of a turbocharger, a throttle position, an inlet pressure, an intake air amount and the like.

In addition, the inverter 2 detects the operating power of the electric supercharger 3 and transmits a power value having been detected to the controller 108.

The generator 103 is an alternator, which converts energy to be generated in the internal combustion engine to an electric energy.

According to this embodiment, the generator 103 supplies an electric power to the on-vehicle electrical equipment 101 and charges the first battery 102.

Furthermore, in case that the charge amount of the first battery 102 is sufficient, the on-off switch 107 is closed by the controller 108 and the second battery 104 is charged by the generator 103 and the first battery 102.

Examples of the on-vehicle electrical equipment 101 include electrical equipments such as a car audio or a head lamp.

The on-vehicle electrical equipment 101 is supplied with an electric power by the generator 103 and the first battery 102.

In the case that the on-off switch 107 is closed, the on-vehicle electrical equipment 101 is supplied with an electric power from the first battery 102, the second battery 104 and the generator 103, and by power generation at the electric supercharger 3 using a surplus of exhaust energy.

The first battery 102 employs a lead storage battery and mainly supplies an electric power to the on-vehicle electrical equipment 101.

In the case that the charge amount of the first battery 102 is sufficient and the operating power of the electric supercharger 3 is less than a predetermined value, the on-off switch 107 is closed by the controller 108 and the second battery 104 is charged by the first battery 102 and the generator 103.

The second battery 104 employs a battery of which internal resistance is smaller than that of the first battery 102, for example, of which internal resistance at the time of full charge at room temperature is not more than 10 mΩ.

This battery has superior charge or discharge characteristics due to its low internal resistance, and allows a large electric current necessary for driving the electric supercharger 3 to be carried and can make an efficient charge at the time of charge.

The controller 108 is an electronic control unit for operating the on-off switch 107 acting to break the circuit between the first battery 102 and the second battery 104.

In the controller 108, a detected voltage of the voltmeter 105 detecting a charge voltage of the first battery 102 and an operating power value of the electric supercharger 3 are used as determination reference for switching, and the controller 108 opens the on-off switch 107 in the case that the voltage value of the first battery 102 (that is, the detected voltage of the voltmeter 105) is smaller than a predetermined voltage value and in the case that the power value that drives the electric supercharger 3 is larger than a predetermined power value.

In this manner, electrical effects on the on-vehicle electrical equipment 101 from the electric supercharger can be suppressed.

Furthermore, in the case that the electric supercharger 3 is not driven, the voltage of the second battery 104 is not less than a predetermined value and that the electric current to be carried through the on-off switch 107 is not more than a predetermined value, the charge voltages of the first battery 102 and the second battery 104 are determined to be equal, the on-off switch 107 is opened.

Incidentally, although in this embodiment, the on-off switch 107 is controlled by the controller 108, the control function of on-off switch may be integrated, for example, into the inverter 2 or an engine ECU.

Figure 3:
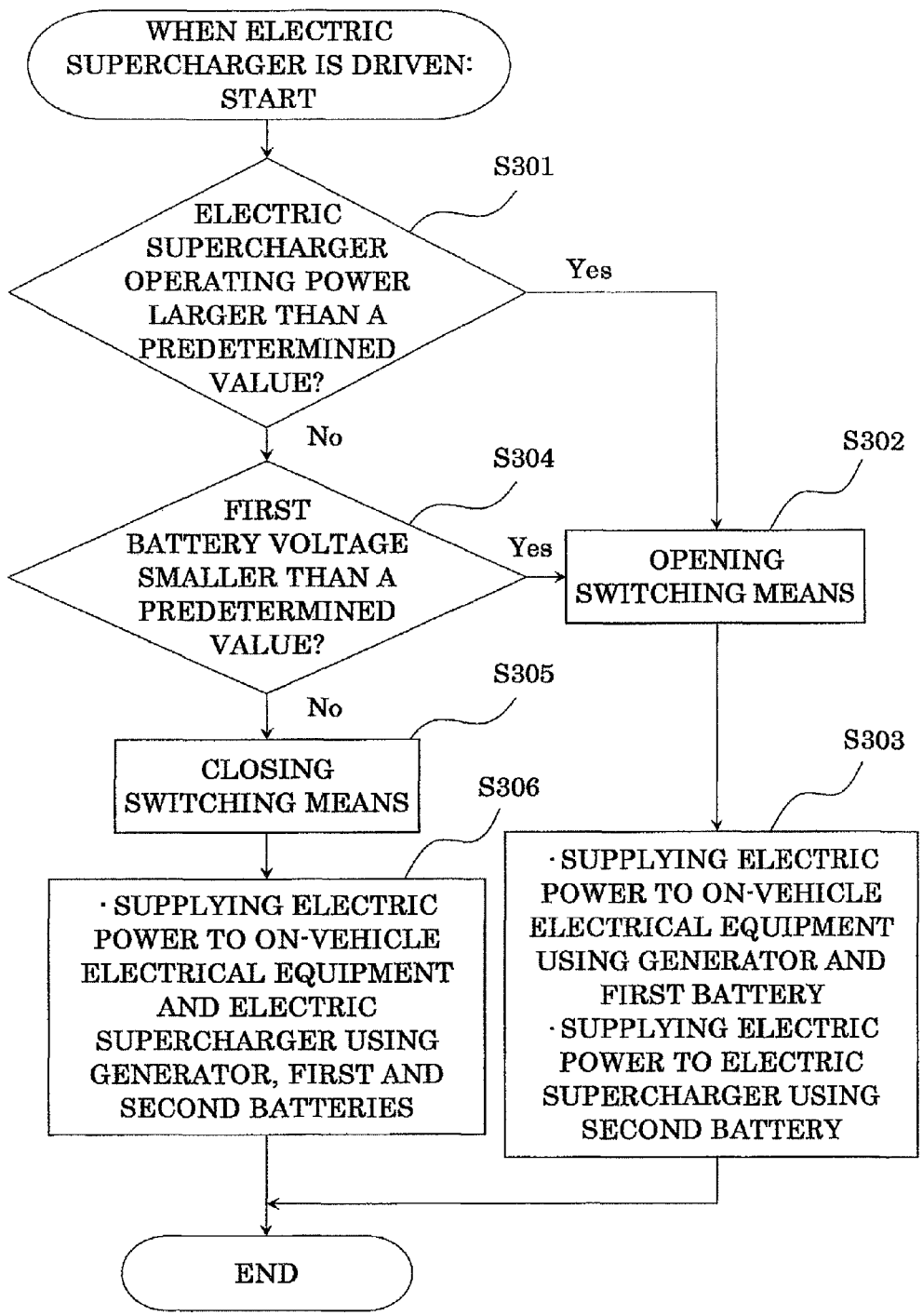
FIG. 3 is a flowchart showing a power supply processing of the power source control unit when the electric supercharger according to the embodiment of the invention is driven.

FIG. 3 is a flowchart showing a power supply processing when the electric supercharger 3 according to this embodiment is driven.

With reference to FIG. 3, the power supply operation when the electric supercharger 3 is driven is hereinafter described.

First, the operation starts from in the state that the on-off switch (switching means) 107 is closed, and it is determined whether the operating power of the electric supercharger 3 is not less than a predetermined value or not more than a predetermined value.

In the case that the operating power of the electric supercharger 3 is determined to be not less than a predetermined value (Step S301), the controller 108 opens the on-off switch 107 (Step S302) and the on-vehicle electrical equipment 101 is supplied with an electric power from the generator 103 and the first battery 102. (Step S303).

In addition, the electric supercharger 3 is supplied with an electric power from the second battery 104. (Step S303)

In this manner, electrical effects on the on-vehicle electrical equipment 101 from the electric supercharger can be suppressed.

In the case that the operating power of the electric supercharger 3 is determined to be not more than a predetermined value, the charge voltage amount of the first battery 102 is detected, and it is determined whether or not the on-vehicle electrical equipment 101 is sufficiently supplied with an electric power.

In the case that the charge voltage amount of the first battery 102 is smaller than a predetermined value (Step S304), the on-off switch 107 is opened (Step S302) and the on-vehicle electrical equipment 101 is supplied with an electric power by the generator 103 and the first battery 102. (Step S303).

In the case that the charge voltage amount of the first battery 102 is larger than a predetermined value, the on-off switch 107 is closed (Step S305) and the on-vehicle electrical equipment 101 and the electric supercharger 3 are supplied with an electric power by the generator 103, the first battery 102 and the second battery 104. (Step S306)

Figure 4:
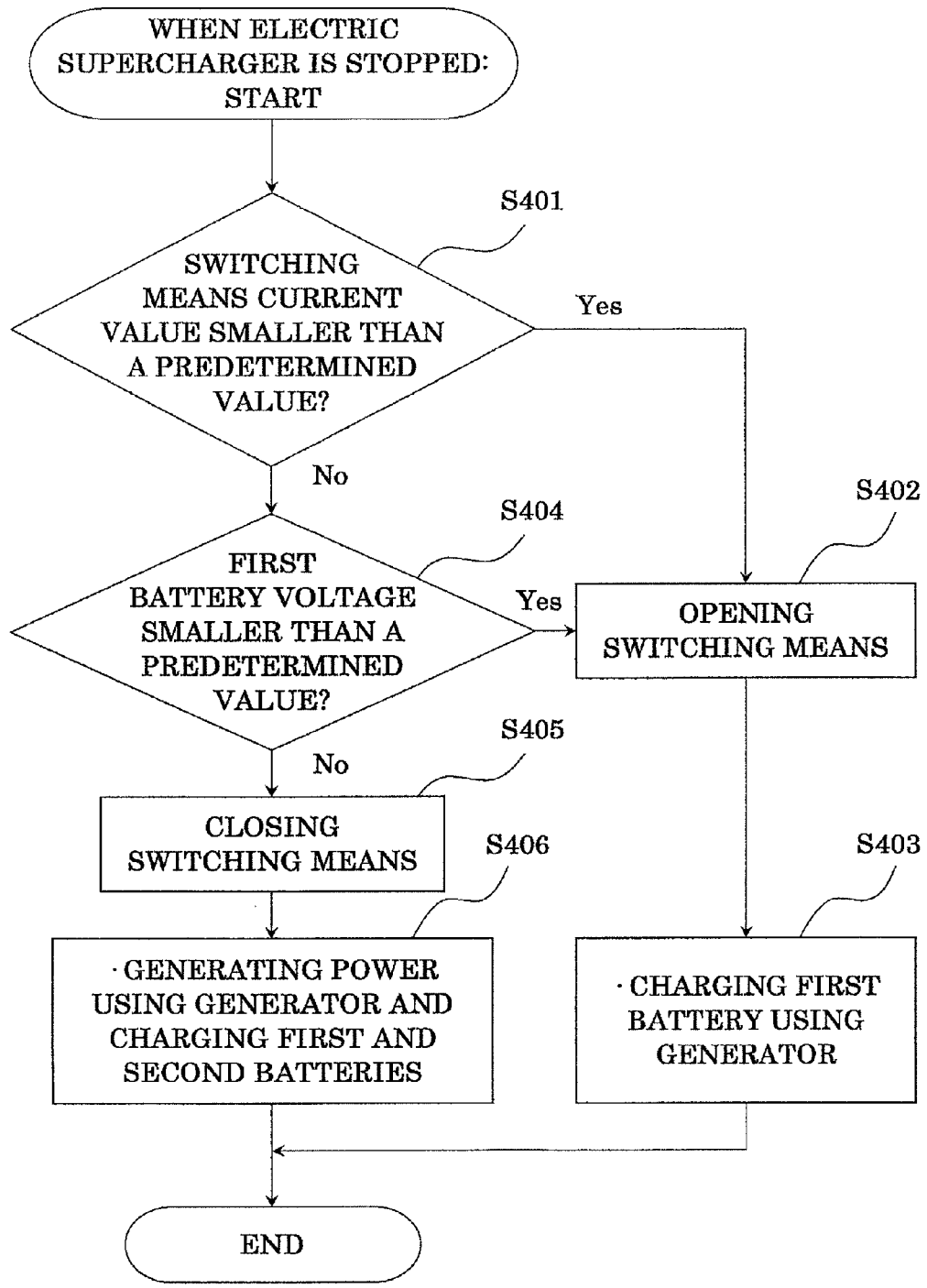
FIG. 4 is a flowchart illustrating a charge processing of the power source control unit when the electric supercharger according to the embodiment of the invention is stopped.

FIG. 4 is a flowchart showing a charge processing when the electric supercharger 3 of this embodiment is stopped.

With reference to FIG. 4, the charge operation when the electric supercharger 3 is stopped is hereinafter described.

First, a current value to be carried through the on-off switch (switching means) 107 is detected by the ammeter 106, and it is determined whether or not the power supply between the first battery 102 and the second battery 104 is conducted.

In the case that the operation proceeds to the power supply flowchart when an electric supercharger is stopped shown in FIG. 4 in the state that the on-off switch 107 is opened, since the current value to be carried through the on-off switch 107 is not more than a predetermined value, the on-off switch is kept in the opened state.

The first battery 102 is charged by the generator 103. When the amount of supercharge pressure is more than that is needed, power generation is conducted by the electric supercharger 3 using a surplus of exhaust energy and the second battery 104 is charged.

In the case that the operation proceeds to the power supply flowchart when an electric supercharger is stopped shown in FIG. 4 in the state that the on-off switch 107 is closed, the current value to be carried through the on-off switch 107 is detected by the ammeter 106. In the case that this current value is smaller than a predetermined value (Step S401), the charge amount of the second battery 104 is determined approaching its full charge and the on-off switch 107 is opened (Step S402).

In the case that the current value to be carried through the on-off switch 107 is larger than a predetermined value, the charge voltage of the first battery 102 is detected, and it is determined whether the first battery 102 can be charged.

In the case that the charge voltage of the first battery 102 is smaller than a predetermined value (Step S404), the on-off switch 107 is opened (Step S402) and the first battery 102 is charged by the generator 103. (Step S403).

In the case that the charge voltage of the first battery 102 is larger than a predetermined value, the on-off switch 107 is closed (Step S405), the generator 3 is brought in power generation, and the first battery 102 and the second battery 104 are charged. (Step S406)

According to this embodiment, due to that the on-off switch 107 between the first battery 102 and the second battery 104 is opened depending on the charge voltage of the first battery 102 and the power amount of the electric supercharger 3, it comes to be possible to eliminate the voltage drop or the voltage fluctuation of the first battery 102 occurring when the electric supercharger 3 is driven, and to prevent the malfunction of the on-vehicle electrical equipment 101 connected to the first battery 102.

Furthermore, in the case that the on-off switch 107 is closed, the first battery 102 and the second battery 104 cover the shortage of charge each other, and charge is conducted by power generation at the generator 103 and at the electric supercharger 3 using exhaust energy.

In this manner, it comes to be possible to make a charge in a short time as well as with reduced engine load as compared with the charge only using the generator 103 to generate an electric power from engine output.

Incidentally, although the charge amount of the first battery 102 is detected by the voltmeter 105 in this embodiment, in case that the charge amount is detected using an ammeter or an SOC of a battery, the on-off switch 107 is controlled with more accurate values to be able to obtain the same advantage.

In addition, although the power consumption of the electric supercharger 3 is detected by the inverter 2 in this embodiment, the control is made in more simple arrangement by detection using an ammeter or a voltmeter, to be able to obtain the same advantage.

As described above, the power source control unit of an electric supercharger according to this embodiment is a power source control unit of an electric supercharger comprises: an electric supercharger 3 located at an intake passage of an internal combustion engine and driven by an electric motor 4; an inverter 2 making a drive control of the electric supercharger 3; and a power supply control unit 1 controlling a power supply to the electric supercharger 3 via the inverter 2 and a power supply to the on-vehicle electrical equipment 101 other than the electric supercharger 3, and in which the power supply control unit 1 includes: a generator 103 generating an electric power using a power of the internal combustion engine; a first battery 102 for supplying an electric power to the on-vehicle electrical equipment 101; voltage detection means 105 detecting a voltage of the first battery 102; a second battery 104 for supplying an electric power to the electric supercharger 3; operating power detection means (one of functions the inverter 2 has) detecting an operating power of the electric supercharger 3; switching means 107 making a switch between the first battery 102 and the second battery 104; current amount detection means 106 detecting an amount of current carried through the switching means 107; and a controller 108 controlling the switching means 107; and in which the controller 108 controlling the switching means 107 in accordance with a voltage of the first battery 102 the voltage detection means 105 detects, an operating power of the electric supercharger 3 the operating power detection means detects and an electric current carried through the switching means 107.

Consequently, according to this embodiment, it is possible to suppress adverse effects on on-vehicle electrical equipments due to the voltage drop or voltage fluctuation of a power source to take place by driving an electric supercharger, and to conduct a stable power supply.

Further, according to this embodiment, the controller 108 controls the switching means 107 and breaks a circuit between the first battery 102 and the second battery 104 in the case that the voltage of the first battery 102 the voltage detection means 105 detects is smaller than a predetermined voltage value.

Furthermore, according to this embodiment, the controller 108 interrupts power supply using the switching means 107 making a switch between the first battery 102 supplying an electric power to the on-vehicle electrical equipment 101 and the second battery 104 supplying an electric power to the electric supercharger 3 in the case that the operating power of the electric supercharger 3 is larger than a predetermined power value when the electric supercharger is driven.

In this manner, it is possible to suppress the voltage drop and voltage fluctuation of the first battery terminal due to the flow of a large electric current to occur when an electric supercharger is driven.

Further, according to this embodiment, the internal resistance of the second battery 104 is smaller than the internal resistance of the first battery 102 and, for example, the internal resistance of the second battery 104 at the time of full charge at room temperatures is not more than 10 mΩ.

This second battery has superior charge or discharge characteristics due to its low internal resistance, and can allow a large electric current necessary for driving the electric supercharger 3 to be carried and can make an efficient charge at the time of charge.

Furthermore, according to this embodiment, in the case that the voltage of the second battery 104 is not less than a predetermined value and the electric current carried through the switching means 107 is not more than a predetermined current value in the state that the electric supercharger 3 is not driven, then the switching means 107 is controlled to break a circuit between the first battery 102 and the second battery 104.

That is, in the case that the electric supercharger 3 is not driven, the voltage of the second battery 104 is not less than a predetermined value and the electric current to be carried through the on-off switch 107 is not more than a predetermined value, the charge voltages of the first battery 102 and the second battery 104 are determined to be equal and the on-off switch 107 is opened.

In this manner, it is possible to prevent the overcharge of the second battery from the first battery 102 and the generator 103 as well as to cut the power consumption to be used for closing the on-off switch 107.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A power source control apparatus comprising:
an inverter which drives an electric motor of an electric supercharger and detects the operating power of said electric supercharger; and
a power supply control unit which controls a power supply to said electric supercharger via said inverter and a power supply to an on-vehicle electrical equipment other than said electric supercharger, and includes:
a generator which generates electric power using a power of an internal combustion engine,
a first battery which supplies electric power to said on-vehicle electrical equipment,
a voltage detector which detects a voltage of said first battery,
a second battery which supplies electric power to said inverter,
a switch which switches between said first battery and said second battery,
a current amount detector which detects an amount of current carried through said switch, and
a controller which controls said switch in accordance with the voltage of said first battery that said voltage detector detects, the operating power of said electric supercharger that said inverter detects, and the amount of the electric current carried through said switch.

2. The power source control unit of an electric supercharger according to claim 1, wherein said controller controls said switch and breaks a circuit between said first battery and said second battery, when the detected voltage of said first battery is smaller than a predetermined voltage value.

3. The power source control unit of an electric supercharger according to claim 1, wherein said controller controls said switch and breaks a circuit between said first battery and said second battery, when the detected operating power of said electric supercharger is larger than a predetermined electric power.

4. The power source control unit of an electric supercharger according to claim 2, wherein said controller controls said switch and breaks a circuit between said first battery and said second battery, when the detected operating power of said electric supercharger is larger than a predetermined electric power.

5. The power source control unit of an electric supercharger according to claim 1, wherein internal resistance of said second battery is smaller than internal resistance of said first battery.

6. The power source control unit of an electric supercharger according to claim 2, wherein internal resistance of said second battery is smaller than internal resistance of said first battery.

7. The power source control unit of an electric supercharger according to claim 3, wherein internal resistance of said second battery is smaller than internal resistance of said first battery.

8. The power source control unit of an electric supercharger according to claim 4, wherein internal resistance of said second battery is smaller than internal resistance of said first battery.

9. The power source control unit of an electric supercharger according to claim 5, wherein the internal resistance of said second battery at the time of full charge at room temperatures is not more than 10 mΩ.

10. The power source control unit of an electric supercharger according to claim 6, wherein the internal resistance of said second battery at the time of full charge at room temperatures is not more than 10 mΩ.

11. The power source control unit of an electric supercharger according to claim 7, wherein the internal resistance of said second battery at the time of full charge at room temperatures is not more than 10 mΩ.

12. The power source control unit of an electric supercharger according to claim 8, wherein the internal resistance of said second battery at the time of full charge at room temperatures is not more than 10 mΩ.

13. The power source control unit of an electric supercharger according to claim 1, wherein, when the voltage of said second battery is not less than a predetermined value and the electric current carried through said switch is not more than a predetermined current value when said electric supercharger is not driven, said switch is controlled to break a circuit between said first battery and said second battery.

14. The power source control unit of an electric supercharger according to claim 2, wherein, when the voltage of said second battery is not less than a predetermined value and the electric current carried through said switch is not more than a predetermined current value when said electric supercharger is not driven, said switch is controlled to break a circuit between said first battery and said second battery.

15. The power source control unit of an electric supercharger according to claim 3, wherein, when the voltage of said second battery is not less than a predetermined value and the electric current carried through said switch is not more than a predetermined current value when said electric supercharger is not driven, said switch is controlled to break a circuit between said first battery and said second battery.

16. The power source control unit of an electric supercharger according to claim 4, wherein, when the voltage of said second battery is not less than a predetermined value and the electric current carried through said switch is not more than a predetermined current value when said electric supercharger is not driven, said switch is controlled to break a circuit between said first battery and said second battery.

17. The power source control unit of an electric supercharger according to claim 5, wherein, when the voltage of said second battery is not less than a predetermined value and the electric current carried through said switch is not more than a predetermined current value when said electric supercharger is not driven, said switch is controlled to break a circuit between said first battery and said second battery.

18. The power source control unit of an electric supercharger according to claim 6, wherein, when the voltage of said second battery is not less than a predetermined value and the electric current carried through said switch is not more than a predetermined current value when said electric supercharger is not driven, said switch is controlled to break a circuit between said first battery and said second battery.

19. The power source control unit of an electric supercharger according to claim 7, wherein, when the voltage of said second battery is not less than a predetermined value and the electric current carried through said switch is not more than a predetermined current value when said electric supercharger is not driven, said switch is controlled to break a circuit between said first battery and said second battery.

20. The power source control unit of an electric supercharger according to claim 8, wherein, when the voltage of said second battery is not less than a predetermined value and the electric current carried through said switch is not more than a predetermined current value when said electric supercharger is not driven, said switch is controlled to break a circuit between said first battery and said second battery.

* * * * *